(12) United States Patent
Asati et al.

(10) Patent No.: US 9,904,844 B1
(45) Date of Patent: Feb. 27, 2018

(54) CLUSTERING LARGE DATABASE OF IMAGES USING MULTILEVEL CLUSTERING APPROACH FOR OPTIMIZED FACE RECOGNITION PROCESS

(71) Applicant: International Business Machines Corporation, Armonk, NY (US)

(72) Inventors: Somnath Asati, Chhatarpur (IN); Bhavani K. Eshwar, Bangalore (IN); Soma Shekar Naganna, Bangalore (IN); Abhishek Seth, Uttar Pradesh (IN); Vishal Tomar, Meerut (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/228,706

(22) Filed: Aug. 4, 2016

(51) Int. Cl.
G06K 9/00 (2006.01)
G06K 9/62 (2006.01)

(52) U.S. Cl.
CPC ....... G06K 9/00288 (2013.01); G06K 9/6218 (2013.01)

(58) Field of Classification Search
CPC .. G06K 9/00288; G06K 9/00; G06K 9/00771; G06K 9/00885
USPC ................ 382/115, 117, 118, 128, 209, 278; 340/5.81, 5.83
See application file for complete search history.

(56) References Cited

U.S. PATENT DOCUMENTS

| | | | |
|---|---|---|---|
| 6,940,545 B1 | 9/2005 | Ray et al. | |
| 7,259,785 B2 | 8/2007 | Stavely et al. | |
| 7,583,294 B2 | 9/2009 | Ray et al. | |
| 7,860,320 B2 | 12/2010 | Luo et al. | |
| 8,462,996 B2 * | 6/2013 | Moon | G06K 9/00335 351/203 |

(Continued)

FOREIGN PATENT DOCUMENTS

| | | |
|---|---|---|
| CN | 103235825 B | 5/2016 |
| KR | 101582142 B1 | 1/2016 |

OTHER PUBLICATIONS

Bhat, Aruna, "Robust Face Recognition by Applying Partitioning Around Medoids Over Eigen Faces and Fisher Faces", International Journal on Computtaional Sciences & Applications, vol. 4, No. 3, Jun. 2014.

(Continued)

*Primary Examiner* — Yosef Kassa
(74) *Attorney, Agent, or Firm* — North Shore Patents, P.C.; Michele Liu Baillie

(57) ABSTRACT

In multilevel clustering for a face recognition process, the first stage clustering is performed on each computing node, using the first x vector coefficients. From the resulting k clusters created in the first stage, a limited number of clusters are selected on which the second stage clustering is performed, using the next y vector coefficients. The search for a matching image is then limited to these selected clusters. Computational costs are reduced at the first stage clustering by using just the first x vector coefficients. Computational costs for the second stage clustering are also reduced by performing the second stage only with the limited number of clusters on a limited number of computing nodes. In this manner, the overall computational costs in the face recognition process is significantly reduced while maintaining a desired level of accuracy.

13 Claims, 3 Drawing Sheets

(56) References Cited

U.S. PATENT DOCUMENTS

| | | | |
|---|---|---|---|
| 8,472,706 B2* | 6/2013 | Schneiderman | G06K 9/00241 382/159 |
| 8,488,863 B2 | 7/2013 | Boucheron | |
| 8,553,037 B2* | 10/2013 | Smith | G06T 13/40 345/473 |
| 8,599,266 B2* | 12/2013 | Trivedi | G06K 9/00234 348/143 |
| 8,615,135 B2* | 12/2013 | Kato | G06K 9/00248 382/201 |
| 8,625,907 B2 | 1/2014 | Zitnick et al. | |
| 8,645,135 B2 | 2/2014 | Hagen et al. | |
| 8,675,059 B2* | 3/2014 | Johnson | G06K 9/00369 340/541 |
| 8,768,105 B2 | 7/2014 | Luo et al. | |
| 9,239,967 B2 | 1/2016 | Liu et al. | |

OTHER PUBLICATIONS

Noureddine Bouhmala, "Multilevel Techniques for the Clustering Problem", International conference on Computer Science & Information Technology, Feb. 2014.

Panagiotis Antonopoulos, Nikos Nikolaidis and Ioannis Pitas, "Hierarchical Face Clustering Using Sift Image Features", Computational Intelligence in Image and Signal Processing, 2007. CIISP 2007. IEEE Symposium, Apr. 2007.

Perronnin, Florent and Degelay, Jean-Luc, "Clustering Face Images with Application to Image Retrieval in Large Databases", Proc. SPIE 5779, Biometric Technology for Human Identification II, 256, Apr. 2005.

Ya'ara Goldschmidt, Meirav Galun, Eitan Sharon, Ronen Basri, and Achi Brandt, "Fast Multilevel Clustering", http://www.wisdom.weizmann.ac.il/~achi/tr05-09.pdf; 2011.

List of IBM Patents or Applications Treated as Related.

* cited by examiner

CLUSTERING LARGE DATABASE OF IMAGES USING MULTILEVEL CLUSTERING APPROACH FOR OPTIMIZED FACE RECOGNITION PROCESS

BACKGROUND

Face recognition requires the comparing of a face image to a database of images. Images are first trained to get n eigen faces which capture the maximum variation in the image database. These n eigen faces act as a basis for lower dimensional space. The images are then projected onto this lower dimensional space, where each image is represented as an n-dimensional feature vector. A query image is also projected onto this lower dimensional space and converted to an n-dimensional vector. A search for a matching image in the database is then performed by comparing the distances between the query image vector and the n-dimensional vectors representing the images in the database. Some existing approaches uses single-level clustering of the images in the database using probabilistic measures of similarity. However, when the image database is large, the computational costs for the search may be overly burdensome and scaling the clustering of the images in the database may be difficult.

SUMMARY

Disclosed herein is a method for multilevel clustering for a face recognition process and a computer program product as specified in the independent claims. Embodiments of the present invention are given in the dependent claims. Embodiments of the present invention can be freely combined with each other if they are not mutually exclusive.

According to an embodiment of the present invention, in a method for multilevel clustering for a face recognition process, a first stage of clustering of an image data set is performed by the one or more computer systems. The image data set comprises a plurality of image vectors representing a plurality of facial images. The first stage of clustering includes choosing k vectors in the image data set as a set of k clusters and assigning each of the remaining image vectors in the image data set to any of the k clusters using first x vector coefficients. A first distance between a query image vector representing a query image and each of the k clusters is calculated using the first x vector coefficients. At least a first cluster and a second cluster are selected from the k clusters for which the first distance is minimum. A second stage of clustering is then performed with the first cluster and the second cluster by the one or more computer systems. In the second stage of clustering, first m image vectors in the first cluster are chosen as a set of first m sub-clusters, and each of the remaining image vectors in the first cluster are assigned to any of the m sub-clusters using next y vector coefficients. Further, first m image vectors in the second cluster are chosen as a set of second m sub-clusters, and each of the remaining image vectors in the second cluster are assigned to any of the second m sub-clusters using the next y vector coefficients. A second distance between the query image vector and the first and second m sub-clusters are calculated using the next y vector coefficients. A first sub-cluster in the first m sub-clusters and a second sub-cluster in the second m sub-clusters for which the second distance is minimum are selected. A given image vector from either the first sub-cluster or the second sub-cluster is selected as matching the query image vector.

According to an embodiments of the present invention, the first stage clustering is performed on each computing node, using the first x vector coefficients. From the resulting k clusters created in the first stage, a limited number of clusters are selected on which the second stage clustering is performed, using the next y vector coefficients. The search for a matching image is then limited to these selected clusters. Computational costs are reduced at the first stage clustering by using just the first x vector coefficients. Computational costs for the second stage clustering are also reduced by performing the second stage only with the limited number of clusters on a limited number of computing nodes. In this manner, the overall computational costs in the face recognition process is significantly reduced while maintaining a desired level of accuracy. Further, embodiments of the present invention may be scaled as the database of images grows.

DETAILED DESCRIPTION

Figure 1:
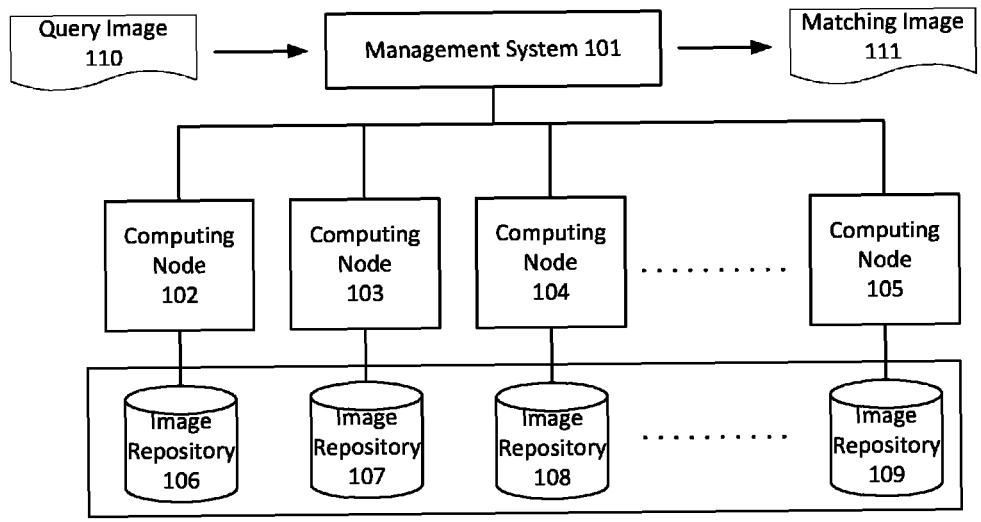
FIG. 1 illustrates a system for multilevel clustering for a face recognition process according to embodiments of the present invention.

Embodiments of the present invention perform multilevel clustering for a face recognition process, as described herein. FIG. 1 illustrates a system for multilevel clustering for a face recognition process according to embodiments of the present invention. The system includes a management system 101 which administers distributed computing by a plurality of computing nodes 102-105. Various specific distributed computing architectures may be used, and the computing nodes 102-105 need not be all of the computing nodes in the distributed system. Each computing node 102-105 has access to an image repository 106-109. The images in the image repositories 106-109 collectively form a database of images against which the face recognition process occurs. The management system 101 receives a query image 110, performs the face recognition process as described herein, and if found, outputs a matching image 111.

Figure 2:
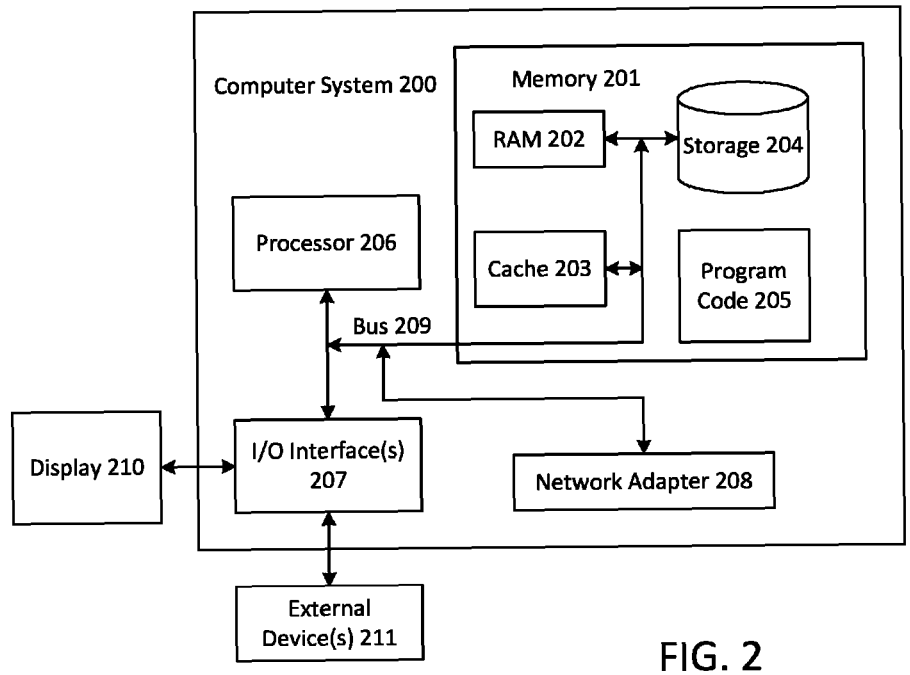
FIG. 2 illustrates a computer system according to embodiments of the present invention.

The management system 101 and each of the computing nodes 102-105 may be implemented as a computer system 200, as illustrated in FIG. 2. The computer system 200 is operationally coupled to a processor or processing units 206, a memory 201, and a bus 209 that couples various system components, including the memory 201 to the processor 206. The bus 209 represents one or more of any of several types of bus structure, including a memory bus or memory controller, a peripheral bus, an accelerated graphics port, and a processor or local bus using any of a variety of bus architectures. The memory 201 may include computer readable media in the form of volatile memory, such as random access memory (RAM) 202 or cache memory 203, or non-volatile storage media 204. The memory 201 may include at least one program product having a set of at least one program code module 205 that are configured to carry out the functions of embodiment of the present invention when executed by the processor 206. The computer system 200 may also communicate with one or more external devices 211, such as a display 210, via I/O interfaces 207. The computer system 200 may communicate with one or more networks via network adapter 208.

Figure 3:
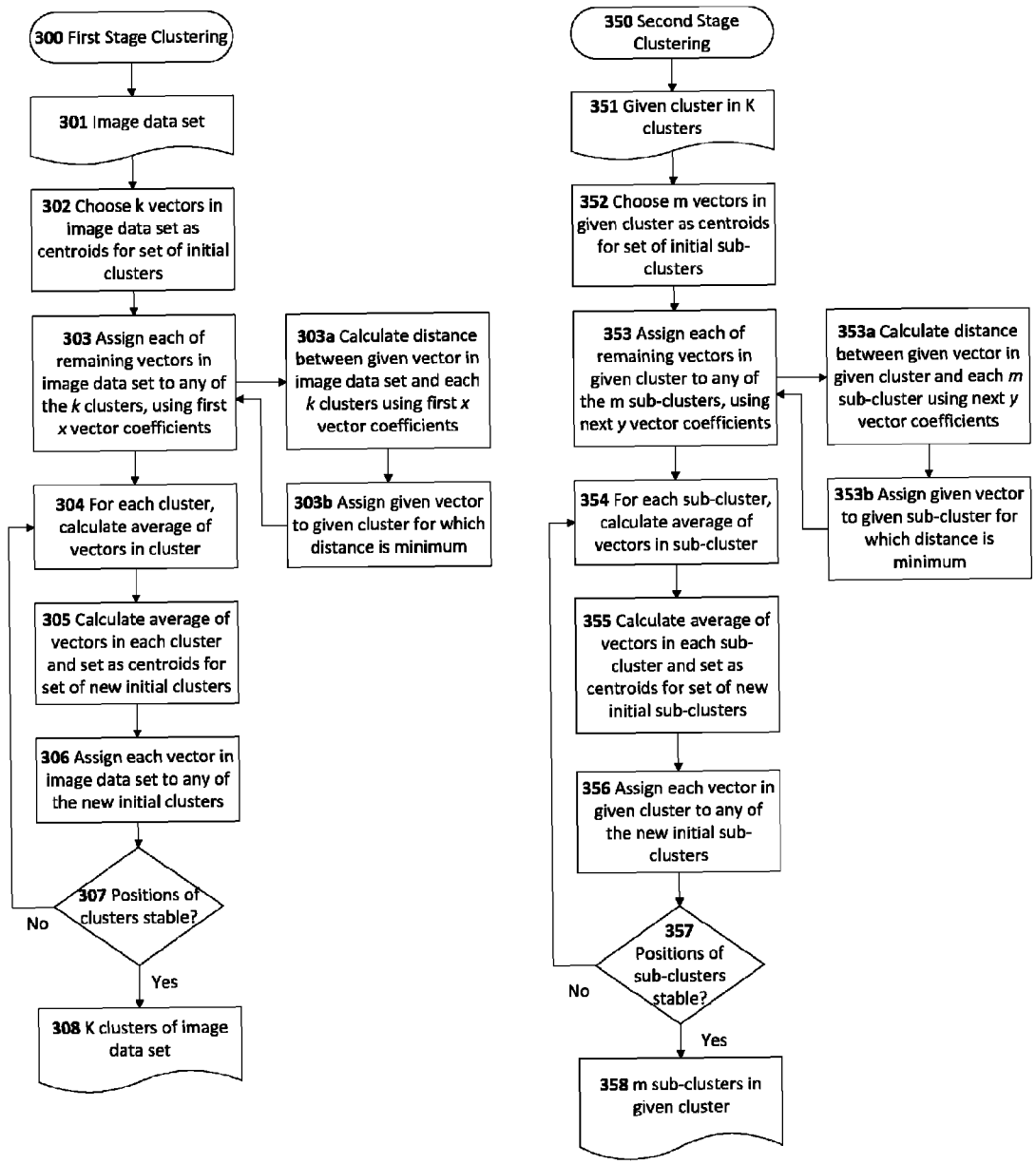
FIG. 3 illustrates a method for multilevel clustering for a face recognition process according to embodiments of the present invention.

FIG. 3 illustrates a method for multilevel clustering for a face recognition process according to embodiments of the present invention. In the illustrated embodiment, at least two stages of clustering of the database of images in the image repositories 106-109 are performed. The first stage of the clustering (300) is performed at each computing node 102-105 and starts with an image data set 301 comprising n-dimensional vectors representing the images in the image repositories 106-109. From the image data set 301, k vectors are chosen as the centroids for a set of initial clusters (302). In the illustrated embodiment, the k vectors are randomly chosen. Each of the remaining vectors in the image data set 301 is assigned to any of the k clusters, using the first x vector coefficients (303). In assigning a given vector in the image data set 301 to a cluster, the distance between the given vector and all k vectors is calculated using the first x vector coefficients (303*a*). The given vector is then assigned to a given cluster for which the distance is minimum (303*b*). In this illustrative embodiment, the distance between the given vector and the centroid of the given cluster is calculated using Euclidean norm. For example, assume that [c1, c2, c3, ..., cn] and [d1, d2, d3, ..., dn] represent two of the n-dimensional vectors of two images and that x=3. The distance between these vectors are then calculated using the first three coefficients of the vectors:

$$\sqrt{(c1-d1)^2+(c2-d2)^2+(c3-d3)^2}$$

This distance is calculated between the given vector and each of the k vectors, and the given vector is assigned to the cluster for which the distance is minimum.

Once all of the vectors in the image data set 301 is assigned to a cluster, an average of the vectors in each cluster is calculated and set as the centroids of a set of new initial clusters (305). Each vector in the image data set 301 is then (re)assigned to any of the new initial clusters (306), using the same process as in steps 303*a*-303*b*. Steps 304-306 are repeated until the positions of the clusters become stable (307), i.e., do not change. At the end of the first stage of clustering, k clusters 308 of the image data set 301 are created at each computing node 102-105.

The second stage of clustering can be performed with any given cluster 351 in the k clusters 308 at any of the computing nodes 102-105, as described further below. From the vectors in the given cluster 351, m vectors are chosen as the centroids for a set of initial sub-clusters (352). In the illustrated embodiment, the m vectors are randomly chosen. Each of the remaining vectors in the given cluster 351 is assigned to any of the m sub-clusters, using the next y vector coefficients (353). In assigning a given vector in the given cluster 351 to a sub-cluster, the distance between the given vector and the m vectors is calculated using the next y vector coefficients (353*a*). The given vector is then assigned to a given sub-cluster for which the distance is minimum (353*b*). For example, assume that [c1, c2, c3, ..., cn] and [d1, d2, d3, ..., dn] represent two of the n-dimensional vectors of two images and that y=4. Using Euclidean norm, the distance between these vectors are then calculated using the next 4 coefficients of the vectors:

$$\sqrt{(c4-d4)^2+(c5-d5)^2+(c6-d6)^2+(c7-d7)^2}$$

This distance is calculated between the given vector and the m vectors, and the given vector is assigned to the sub-cluster for which the distance is minimum.

Once all of the vectors in the given cluster 351 is assigned to a sub-cluster, an average of the vectors in each sub-cluster is calculated and set as centroids for a set of new initial sub-clusters (355). Each vector in the given cluster 351 is then (re)assigned to any of the new initial sub-clusters (356), using the same process as in steps 353*a*-353*b*. Steps 354-356 are repeated until the positions of the sub-clusters become stable (357), i.e., do not change. At the end of the second stage of clustering, the given cluster 351 has m sub-clusters 358.

Optionally, further levels of clustering may be performed with the next set of vector coefficients in a manner similar to the above. The computational costs of clustering and the level of accuracy desired are potential factors in setting the number of levels of clustering to be performed.

Figure 4:
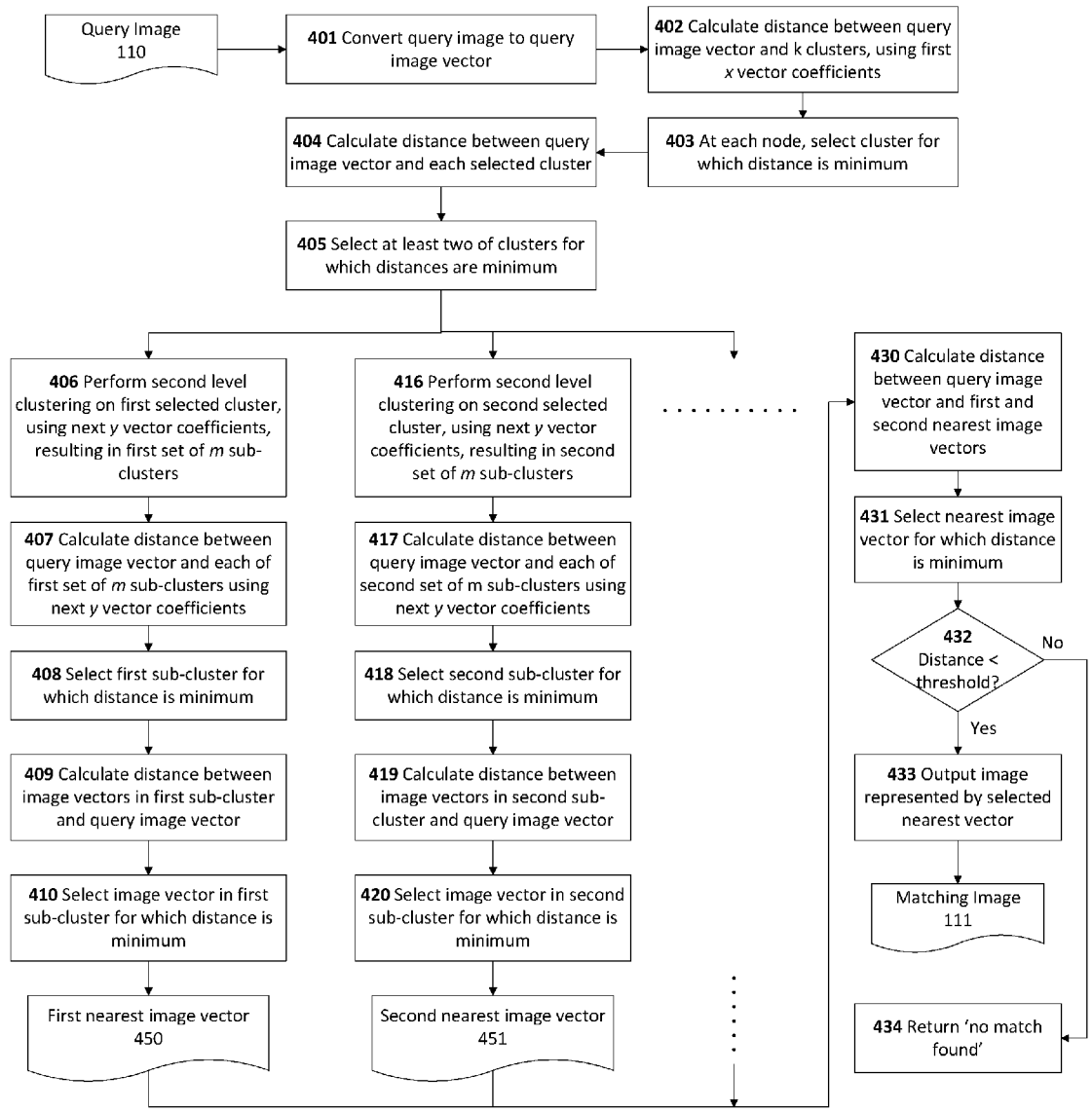
FIG. 4 illustrates a method of image searching when multilevel clustering for a face recognition process is implemented, according to embodiments of the present invention.

FIG. 4 illustrates a method of image searching when multilevel clustering for a face recognition process is implemented, according to embodiments of the present invention. Assume that a query image 110 is received. A search is then conducted for an image in the image repositories 106-109 that is closest to the query image, in the following manner. The query image is first converted to an n-dimensional query image vector (401). In the illustrated embodiment, prior to receipt of the query image, the first stage of clustering has been performed at each computing node 102-105, resulting in k clusters 308 at each computing node 102-105. The distance between the query image vector and the k clusters at each computing node 102-105 is calculated using the first x vector coefficients (402), using the same process as steps 303*a*-303*b*, described above. At each computing node 102-105, the cluster for which distance is minimum is selected (403), resulting in a set comprised of one cluster selected at each computing node 102-105. The distance between the query image vector and each of the set of selected clusters is then calculated (404). At least two of the set of selected clusters for which distances are minimum are then selected (405), with at least a first selected cluster at a first computing node and a second selected cluster at a second computing node. Selecting at least two nearest clusters removes the possibility of searching for a matching image only in one cluster in which the matching image may not be present.

At the first computing node, the second level clustering is performed on the first selected cluster (406), using the next y vector coefficients as described above with reference to FIG. 3. The second level clustering at the first computing node results in a first set of m sub-clusters. The distance between the query image vector and each of the first set of m sub-clusters is calculated (407), and a first sub-cluster for which the distance is minimum is selected (408). The distances between the image vectors in the first sub-cluster and the query image vector is then calculated (409), and the image vector in the first sub-cluster for which distance is minimum is selected (410) as the first nearest image vector 450.

At the second computing node, the second level clustering is performed on the second selected cluster (416), using the next y vector coefficients as described above with reference to FIG. 3. The second level clustering at the second computing node results in a second set of m sub-clusters. The distance between the query image vector and each of the second set of m sub-clusters is calculated (417), and a second sub-cluster for which the distance is minimum is selected (418). The distances between the image vectors in the second sub-cluster and the query image vector is then calculated (419), and the image vector in the second subcluster for which distance is minimum is selected (420) as the second nearest image vector 451.

If more than two clusters are selected at step 405, then the process performed at the first and second selected computing nodes is repeated with each of the other selected clusters, resulting in more nearest image vectors.

The distance between the first nearest image vector and the query image vector, and the distance between the second nearest image vector and the query image vector, are calculated (430), and the nearest image vector for which distance is minimum is selected (431). If more nearest image vectors exist, then the distances between each of these nearest image vectors are also calculated, and the nearest image vector for which the distance is minimum is selected. If the distance for the selected nearest image vector is less than a specified threshold (432), then the image represented by the selected nearest image vector is output as the matching image 111 (433). Otherwise, a "no match found" is returned (434). Here, the threshold represents a level of similarity desired for an image to be considered a match.

As described above, embodiments of the present invention performs the first stage clustering on each computing node, using the first x vector coefficients. From the resulting k clusters created in the first stage, a limited number of clusters are selected on which the second stage clustering is performed, using the next y vector coefficients. The search for a matching image is then limited to these selected clusters. Computational costs are reduced at the first stage clustering by using just the first x vector coefficients. Computational costs for the second stage clustering are also reduced by performing the second stage only with the limited number of clusters on a limited number of computing nodes. In this manner, the overall computational costs in the face recognition process is significantly reduced while maintaining a desired level of accuracy. Further, embodiments of the present invention may be scaled as the database of images grows.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for multilevel clustering for a face recognition process, the computer program product comprising one or more computer readable storage media having program instructions embodied therewith, the program instructions executable by one or more processors to:
    perform a first stage of clustering of an image data set by the one or more computer systems, the image data set comprising a plurality of image vectors representing a plurality of facial images, comprising:
        choose k vectors in the image data set as a set of k clusters; and
        assign each of the remaining image vectors in the image data set to any of the k clusters using first x vector coefficients;
    calculate a first distance between a query image vector representing a query image and each of the k clusters using the first x vector coefficients;
    select at least a first cluster and a second cluster from the k clusters for which the first distance is minimum;
    perform a second stage of clustering with the first cluster and the second cluster by the one or more computer systems, comprising:
        choose first m image vectors in the first cluster as a set of first m sub-clusters, and assign each of the remaining image vectors in the first cluster to any of the m sub-clusters using next y vector coefficients; and
        choose first m image vectors in the second cluster as a set of second m sub-clusters and assign each of the remaining image vectors in the second cluster to any of the second m sub-clusters using the next y vector coefficients;
    calculate a second distance between the query image vector and the first and second m sub-clusters using the next y vector coefficients;
    select a first sub-cluster in the first m sub-clusters and a second sub-cluster in the second m sub-clusters for which the second distance is minimum; and
    select a given image vector from either the first sub-cluster or the second sub-cluster as matching the query image vector.

2. The computer program product of claim 1, wherein the assigning of each of the remaining image vectors in the image data set to any of the k clusters using the first x vector coefficients comprises:
    calculate a third distance between a given image vector in the image data set and each of the k clusters using the first x vector coefficients; and
    assign the given vector to a given cluster of the k clusters for which the third distance is minimum.

3. The computer program product of claim 1, wherein the first stage of clustering is performed at each of a plurality of computer systems, wherein the selecting of at least the first cluster and the second cluster from the k clusters for which the first distance is minimum comprises:
    at each of the plurality of computer systems, select a given cluster from the k clusters for which the first distance is minimum;
    calculate a third distance between the query image vector and each of the selected given clusters; and
    select at least the first cluster at a first computer system and the second cluster at the second computer system for which the third distance is minimum,
    wherein the second stage of clustering is performed with the first and second clusters at the first and second computer systems.

4. The computer program product of claim 1, wherein the assigning of each of the remaining image vectors in the first cluster to any of the m sub-clusters using the next y vector coefficients comprises:
    calculate a third distance between a given vector in the first cluster and each of the m sub-clusters using the next y vector coefficients; and
    assign the given vector in the first cluster to a given sub-cluster of the m sub-clusters for which the third distance is minimum.

5. The computer program product of claim 1, wherein the selecting of the given image vector from either the first sub-cluster or the second sub-cluster as matching the query image vector comprises:
    calculate a third distance between the query image vector and each of the image vectors in the first sub-cluster and selecting a first nearest image vector in the first sub-cluster for which the third distance is minimum; and
    calculate a fourth distance between the query image vector and each of the image vectors in the second sub-cluster and selecting a second nearest image vector in the second sub-cluster for which the fourth distance is minimum.

6. The computer program product of claim 5, wherein the selecting of the given image vector from either the first sub-cluster or the second sub-cluster as matching the query image vector further comprises:
calculate a fifth distance between the query image vector and the first nearest image vector;
calculate a sixth distance between the query image vector and the second nearest image vector; and
select either the first nearest image vector or the second nearest image vector for which either the fifth distance or the sixth distance is minimum.

7. The computer program product of claim 1, further comprising:
determine whether the given image vector is within a predetermined similarity threshold; and
based on determining that the given image vector is within the predetermined similarity threshold, output an image represented by the given image vector as matching the query image.

8. A system, comprising:
one or more processors; and
one or more computer readable storage media having program instructions embodied therewith, the program instructions executable by the one or more processors to:
perform a first stage of clustering of an image data set by the one or more computer systems, the image data set comprising a plurality of image vectors representing a plurality of facial images, comprising:
choose k vectors in the image data set as a set of k clusters; and
assign each of the remaining image vectors in the image data set to any of the k clusters using first x vector coefficients;
calculate a first distance between a query image vector representing a query image and each of the k clusters using the first x vector coefficients;
select at least a first cluster and a second cluster from the k clusters for which the first distance is minimum;
perform a second stage of clustering with the first cluster and the second cluster by the one or more computer systems, comprising:
choose first m image vectors in the first cluster as a set of first m sub-clusters, and assign each of the remaining image vectors in the first cluster to any of the m sub-clusters using next y vector coefficients; and
choose first m image vectors in the second cluster as a set of second m sub-clusters and assign each of the remaining image vectors in the second cluster to any of the second m sub-clusters using the next y vector coefficients;
calculate a second distance between the query image vector and the first and second m sub-clusters using the next y vector coefficients;
select a first sub-cluster in the first m sub-clusters and a second sub-cluster in the second m sub-clusters for which the second distance is minimum; and
select a given image vector from either the first sub-cluster or the second sub-cluster as matching the query image vector.

9. The system of claim 8, wherein the assigning of each of the remaining image vectors in the image data set to any of the k clusters using the first x vector coefficients comprises:
calculate a third distance between a given image vector in the image data set and each of the k clusters using the first x vector coefficients; and
assign the given vector to a given cluster of the k clusters for which the third distance is minimum.

10. The system of claim 8, wherein the first stage of clustering is performed at each of a plurality of computer systems, wherein the selecting of at least the first cluster and the second cluster from the k clusters for which the first distance is minimum comprises:
at each of the plurality of computer systems, select a given cluster from the k clusters for which the first distance is minimum;
calculate a third distance between the query image vector and each of the selected given clusters; and
select at least the first cluster at a first computer system and the second cluster at the second computer system for which the third distance is minimum,
wherein the second stage of clustering is performed with the first and second clusters at the first and second computer systems.

11. The system of claim 8, wherein the assigning of each of the remaining image vectors in the first cluster to any of the m sub-clusters using the next y vector coefficients comprises:
calculate a third distance between a given vector in the first cluster and each of the m sub-clusters using the next y vector coefficients; and
assign the given vector in the first cluster to a given sub-cluster of the m sub-clusters for which the third distance is minimum.

12. The system of claim 8, wherein the selecting of the given image vector from either the first sub-cluster or the second sub-cluster as matching the query image vector comprises:
calculate a third distance between the query image vector and each of the image vectors in the first sub-cluster and selecting a first nearest image vector in the first sub-cluster for which the third distance is minimum; and
calculate a fourth distance between the query image vector and each of the image vectors in the second sub-cluster and selecting a second nearest image vector in the second sub-cluster for which the fourth distance is minimum.

13. The system of claim 12, wherein the selecting of the given image vector from either the first sub-cluster or the second sub-cluster as matching the query image vector further comprises:
calculate a fifth distance between the query image vector and the first nearest image vector;
calculate a sixth distance between the query image vector and the second nearest image vector; and
select either the first nearest image vector or the second nearest image vector for which either the fifth distance or the sixth distance is minimum.

* * * * *